United States Patent
Kojaku et al.

(10) Patent No.: US 9,087,294 B2
(45) Date of Patent: Jul. 21, 2015

(54) PREDICTION METHOD, PREDICTION SYSTEM AND PROGRAM

(71) Applicant: International Business Machines Corporation, Armonk, NY (US)

(72) Inventors: Sadamori Kojaku, Tokyo (JP); Tetsuro Morimura, Tokyo (JP); Takayuki Osogami, Tokyo (JP); Rikiya Takahaski, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/732,693

(22) Filed: Jan. 2, 2013

(65) Prior Publication Data

US 2013/0179380 A1 Jul. 11, 2013

(30) Foreign Application Priority Data

Jan. 11, 2012 (JP) ................................. 2012-003233

(51) Int. Cl.
| | |
|---|---|
| *G06F 17/00* | (2006.01) |
| *G06N 5/02* | (2006.01) |
| *G06N 99/00* | (2010.01) |
| *G06F 17/18* | (2006.01) |
| *G06Q 50/06* | (2012.01) |

(52) U.S. Cl.
CPC *G06N 5/02* (2013.01); *G06F 17/18* (2013.01); *G06N 99/005* (2013.01); *G06Q 50/06* (2013.01)

(58) Field of Classification Search
None
See application file for complete search history.

(56) References Cited

U.S. PATENT DOCUMENTS

| 7,684,965 | B2 * | 3/2010 | Sekine et al. ..................... 703/2 |
| 2007/0011110 | A1 * | 1/2007 | Selvaraj et al. .................. 706/12 |
| 2009/0177443 | A1 * | 7/2009 | Nikovski et al. .............. 702/196 |

FOREIGN PATENT DOCUMENTS

| JP | 06-110505 | | 4/1994 |
| JP | 10075281 | A | 3/1998 |
| JP | 2000-259223 | A | 9/2000 |
| JP | 2003-200079 | A | 7/2003 |
| JP | 2003-303020 | A | 10/2003 |
| JP | 2004-118658 | A | 4/2004 |

(Continued)

OTHER PUBLICATIONS

"Probabilistic short-term wind power forecasting based on kernel density estimators" Jeremie Juban, Lionel Fugon, Georges Kariniotakis European Wind Energy Conference and exhibition, EWEC 2007, May 2007, Milan, Italy.*

*Primary Examiner* — Kakali Chaki
*Assistant Examiner* — Luis Sitiriche
(74) *Attorney, Agent, or Firm* — Cantor Colburn LLP

(57) ABSTRACT

A method for predicting an output variable from explanatory values provided as sets of combinations of discrete variables and continuous variables includes receiving input data that contains the explanatory variables to predict the output variable; searching for each element in the combinations for elements in a plurality of sets with matching discrete variables using training data which the output variable has been observed; applying a function giving the degree of similarity between two sets weighed by a scale variable to each element in the input data, and to one or more elements found in the elements of the input data to calculate function values, and calculating the sum of the function values for all of the elements in the input data; and applying the calculated sum for each element to a prediction equation for predicting the output variable to calculate a prediction value of the output variable for each element.

18 Claims, 11 Drawing Sheets

(56) References Cited

FOREIGN PATENT DOCUMENTS

| | | |
|---|---|---|
| JP | 2007-122418 A | 5/2007 |
| JP | 2009-116842 | 5/2009 |
| JP | 2010-072986 A | 4/2010 |
| JP | 2010-256328 | 11/2010 |
| JP | 2011-198191 A | 10/2011 |

* cited by examiner (a)

|  | Mean Square Error | Médian Absolute Déviation | Avg. Log Likelihood |
|---|---|---|---|
| Conventional Method | $5.58e^{23} \pm 1.85e^{23}$ | $7.68e^{11} \pm 1.29e^{11}$ | $-28.78 \pm 0.21$ |
| Proposed Method | $6.89e^{21} \pm 1.42e^{21}$ | $3.38e^{9} \pm 0.59e^{9}$ | $-24.84 \pm 0.14$ |

(b)

|  | Mean Square Error | Médian Absolute Déviation | Avg. Log Likelihood |
|---|---|---|---|
| Conventional Method | $1.67e^{23} \pm 0.48e^{23}$ | $3.66e^{11} \pm 0.88e^{11}$ | $-28.16 \pm 0.16$ |
| Proposed Method | $2.14e^{2} \pm 0.32e^{21}$ | $2.12e^{9} \pm 0.14e^{9}$ | $-24.34 \pm 0.03$ |

(a)

(b)

(a)

(b)

(a)

(b)

PREDICTION METHOD, PREDICTION SYSTEM AND PROGRAM

PRIORITY

This application claims priority to Japanese Patent Application No. 2012-003233, filed 11 Jan. 2012, and all the benefits accruing therefrom under 35 U.S.C. §119, the contents of which in its entirety are herein incorporated by reference.

BACKGROUND

The present disclosure relates to a method and system for accurately predicting data such as the electric power consumed in a manufacturing process, a system using this method, and a computer-readable program for realizing this method.

Automotive and electrical parts are manufactured by melting and molding many different materials such as metals and plastics and then assembling the resulting components. In the case of the iron used in these parts, the ore is ground and melted, carbon and other metals are added, and the combination is molded into a predetermined shape. The electric power consumed in this manufacturing process can be estimated, for example, from the physical properties and utilized amounts of raw materials such as iron, copper, polyethylene and polypropylene. One such technique is known as regression analysis.

Regression analysis is a statistical method to predict an output variable based on a multivariate function using a plurality of explanatory variables, and such a multivariate function is called regression equation. Regression analysis can also determine a distribution of the output variable, based on the estimated variance of the residuals. By collecting datasets that relate actual power consumption with the physical properties and the amounts of raw materials, one can numerically determine the regression equation to predict the electronic power consumed in the manufacturing process. The electric power to be predicted is actually given with substituting the values representing the physical properties and amounts of raw materials into the fitted regression equation.

Conditional density estimation is known to be another technique that can be applied for predicting power consumption. Also in conditional density estimation, a relationship equation between an output variable and explanatory variables is derived as in regression analysis. Instead of the average of the output variable, a conditional probability density function representing the probability distribution of the output variable is derived. In regression analysis, a parametric assumption such as Gaussianity is placed in an error distribution. In conditional density estimation, a complex distribution is handled in most cases in which the error distribution is not limited to a Gaussian distribution using a parametric method.

For example, a technique has been disclosed that is able to accurately predict the probability of a predicted state while incorporating interaction between the explanatory variables and non-linearity of the regression equation (see JP 2007-122418). In this technique, training data is first read from a database. This training data is a sample set including a plurality of explanatory variables and output variables representing the presence or absence of a certain state occurring. A regression coefficient in a regression equation modeled with a kernel function serving as the sum of element kernel functions prepared for each explanatory variable is determined with optimizing a target function given in advance using the training data.

Afterwards, in this technique, a plurality of explanatory variables serving as inputted parameters are plugged into the regression equation to obtain an output variable. The obtained output variable is plugged into a probability prediction function to predict the probability of a certain state occurring or not occurring. Here, the kernel function has a relationship represented by the inner product of a feature vector, such as a kernel function between $i^{th}$ data and $j^{th}$ data of $k(x(i), x(j)) = <\phi(x(i)), \phi(x(j))>$ where $\phi(x(i))$ is a vector expression in the d-dimensional feature space of data $x(i)$.

Based on the kernel trick, another regression method has also been disclosed where relationship between qualitatively-different types of a plurality of datasets and a response value is modeled, and multiple kernel learning algorithm is applied for optimizing each weight in a plurality of kernel functions with computer processing of a training data (see JP 2011-198191). In this method, for each type of the datasets, a similarity matrix and its corresponding graph Laplacian matrix are computed. Then, the variance of a coupling constant and an observation model is calculated in a variational Bayesian method using the graph Laplacian matrices, assuming all of the graph Laplacian matrices are provided as linear combinations with the coupling constant, the observation model with observed data is a normal distribution, the latent variable used to explain the observed data is also a normal distribution, and the coupling constant is in accordance with a gamma prior distribution. Afterwards, a prediction distribution for given inputted data is determined from a Laplace approximation using the variance of the coupling constant and the observation model.

Thus, it is possible to execute a multiple kernel learning process with a reasonable amount of computational costs by assuming a probabilistic model with observed variables, latent variables associated with them, and a coupling constant, and by optimizing this on the basis of a variational Bayesian method.

SUMMARY

In one embodiment, a method for predicting an output variable from explanatory values provided as sets of combinations of discrete variables and continuous variables includes receiving, with a processing device, input data that contains the explanatory variables to predict the output variable; searching for each element in the combinations of discrete variables and continuous variables in the sets included in the input data for elements in a plurality of sets with matching discrete variables using training data related to a plurality of sets in which the output variable has been observed; applying a function giving the degree of similarity between two sets weighed by a scale variable that represents a scalar corresponding to the output variable and is obtained from a continuous variable to each element in the input data, and to one or more elements found in the elements of the input data to calculate function values, and for calculating the sum of the function values for all of the elements in the input data; and applying the calculated sum for each element to a prediction equation for predicting the output variable to calculate a prediction value of the output variable for each element.

In another embodiment, a system for predicting an output variable from explanatory values provided as sets of combinations of discrete variables and continuous variables includes a data-input unit configured to receive input data that contains the explanatory variables to predict the output variable; an element-search unit configured to search for each element in the combinations of discrete variables and continuous variables in the sets included in the input data for elements in a plurality of sets with matching discrete variables using training data related to a plurality of sets in which the output variable has been observed; a function-calculating unit configured to apply a function giving the degree of similarity between two sets weighed by a scale variable representing a scalar corresponding to the output variable obtained from a continuous variable to each element in the input data and to one or more elements found in the elements of the input data to calculate function values, and to calculate the sum of the function values for all of the elements in the input data; and a prediction-value-calculating unit configured to apply the calculated sum for each element to a prediction equation for predicting the output variable to calculate a prediction value of the output variable for each element.

In another embodiment, a computer-readable storage medium having computer readable instruction stored thereon, that when executed by a computer implement a method for predicting an output variable from explanatory values provided as sets of combinations of discrete variables and continuous variables. The method includes receiving, with a processing device, input data that contains the explanatory variables to predict the output variable; searching for each element in the combinations of discrete variables and continuous variables in the sets included in the input data for elements in a plurality of sets with matching discrete variables using training data related to a plurality of sets in which the output variable has been observed; applying a function giving the degree of similarity between two sets weighed by a scale variable that represents a scalar corresponding to the output variable and is obtained from a continuous variable to each element in the input data, and to one or more elements found in the elements of the input data to calculate function values, and for calculating the sum of the function values for all of the elements in the input data; and applying the calculated sum for each element to a prediction equation for predicting the output variable to calculate a prediction value of the output variable for each element.

BRIEF DESCRIPTION OF THE SEVERAL VIEWS OF THE DRAWINGS

FIG. 7 is a diagram showing in table format simulation results obtained using the conventional kernel regression method and the present method.

DETAILED DESCRIPTION

Figure 1:
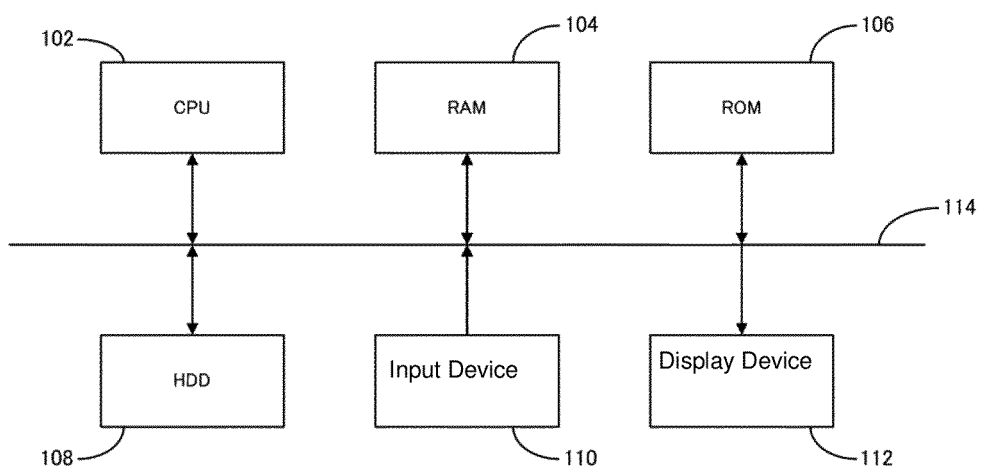
FIG. 1 is a diagram showing an example of a hardware configuration for a system in accordance with an exemplary embodiment.

A regression method for predicting electric power consumption in a manufacturing process from such factors as the physical properties of raw materials experiences the following problems. The first problem is that output variables used as training data are only partially observed.

For example, in the manufacturing process at a certain steel plant, power consumption totals may be taken and stored in data collection at 30-minute intervals. In this process, a plurality of raw materials with different physical properties may be processed in different amounts every 30 minutes. As a result, samples such as the amount of power consumed when a single type of raw material is processed cannot be obtained as training data. Only power consumption totals measured at 30-minute intervals for certain combinations of raw materials processed in certain quantities can be obtained.

The second problem is that some explanatory variables such as the types of raw materials depend on such factors as physical properties and quantity. Because these are dummy variables (discrete variables to represent the classes of materials), the prediction accuracy of the conventional regression method is low.

This is because types of raw materials, etc., are not obtained as continuous values unlike physical properties and quantities, but only obtained as discrete values to represent whether or not it is a certain raw material.

Kernel functions include linear kernels, polynomial kernels, and radical basis function (RBF) kernels (also referred to as Gaussian kernels). RBF kernels are widely used in general non-linear prediction methods. This can also be restored to any regression function in situations where sufficient samples have been obtained. However, in situations where only power totals at 30-minute intervals have been stored, the number of samples is limited and generalization error of regression methods using RBF kernels is unacceptably high.

The third problem is that power consumption is summed, for example, in a different order of units at 30-minute intervals and it is sometimes difficult to set the scale for the error distribution in the regression problem. If the order of power consumption is different, the order in the error distribution may also change accordingly. Because power consumption by each raw material cannot be measured individually, it is difficult to determine what order to set for the scale of the error distribution.

Conventional regression methods, including the methods in the above described publications, do not take into account limits on the number of samples in training data, lower prediction accuracy because of the inclusion of discrete variables, and the difficulty of setting the scale for the error distribution. Thus, conventional regression methods cannot solve these problems. Therefore, a method that is able to solve this problem and a system for embodying this method are desired.

The present disclosure solves these problems by providing the following prediction method, prediction system for embodying this method, and computer-readable program enabling a computer to function as this prediction system.

This prediction method is executed by a computer and aims for predicting an output variable from a plurality of explanatory variables containing both discrete variables and continuous variables. This prediction method includes receiving input data containing the explanatory variables to predict the output variable, and searching for elements whose discrete variables are the same, where each element consists of one discrete variable and a multidimensional vector of continuous variables and each unit consists of a set of elements.

This method also includes applying a function giving the degree of similarity between two sets weighed by scale variables, where each scale variable is a scalar associated with one element, roughly proportional to the output variable, and obtained from the continuous variables contained in each element, This method further includes calculating the sum of the function values for all of the elements in the input data, and plugging the calculated sum for each element into a prediction equation to forecast the output variable assigned for each element and the sum of the output variables for all of the elements.

In this way, a function weighted by a scale variable representing a scalar that is roughly proportional to the output variable obtained from a continuous variable is applied only to elements with matching discrete variables, function values are calculated, the sum is determined for each, and a prediction value for the output variable is calculated for each element. Thus, a predicted value of the output variable can be obtained for combinations of elements not included in the training data, even when the output variable has only been partially observed and even when the explanatory variables include discrete variables.

Also, a predicted value of the output variable can be obtained for individual elements even when there is not a close correspondence between individual elements and the output variable. In addition, a value for the output variable can be predicted only with small error, even when elements with a different order of output variables are included.

The present disclosure is particularly useful as a method for predicting power consumption by a manufacturer, when each product is manufactured by melting and molding raw materials. Here, a discrete variable represents the type of raw material included in a unit in which power consumption is being observed. Continuous variables are represented as a vector summarizing continuous quantities related to the raw material included in the unit. A scale variable is almost proportional to the output variable, and is computed with a function of a plurality of variables derived from the volume, mass or other variable of the raw material included in the unit. The output variable is the amount of electric power consumed by the unit.

Kernel function gives the degree of similarity between two sets, and RBF kernel can universally provide highly accurate predictions in many datasets. In this way, the value of an output variable can be predicted even when the relationship between the output variable and the explanatory variables is non-linear.

The essence of the aforementioned prediction function is either a regression equation or a conditional density function. Regression equation and conditional density function implicitly handle high-dimensional feature vectors as inputs, but explicit computation of the high-dimensional feature vector can be eliminated when instead values of the kernel function are calculated. Hence applying kernel function for the prediction can reduce computational times.

Applicable prediction method using kernel functions is one of nonparametric regression methods or conditional density estimators whose examples are Gaussian process regression, Nadaraya-Watson kernel regression, Relevance vector regression, Support vector regression, the Kullback-Leibler importance estimation procedure, and the Least-Square conditional density estimation. Other methods are applicable if a kernel matrix and kernel vector calculation are included as described below.

In addition, when the actual prediction method to be adopted is Gaussian process regression that includes optimizing a set of hyperparameters using training data, computing a kernel matrix based on the optimized hyperparameters in the kernel function, and calculating parameters in the prediction equation using the derived kernel matrix. The parameters in the prediction equation are typically regression coefficient s and variance-covariance matrix. For predicting power consumption, the parameters of the regression equation are needed and they are essentially computed with the optimized hyperparameters.

Discussed below are examples of the operations actually executed. The optimization operation computes the value of each hyperparameter with maximizing the marginal likelihood given in the Gaussian process regression. The operation for computing the kernel matrix calculates another diagonal matrix based on a plurality of scale variables included in for each set of the explanatory variables. The operation for setting the prediction equation calculates the parameters of the regression equation using both of the kernel matrix and the diagonal matrix.

In the present disclosure, a system can also be provided to embody the method described above. This system includes a data-input unit for receiving input data, an element-search unit for calculating the elements, a function-value-computation unit for calculating the sum of the function values, and a prediction-value-computation unit for calculating a prediction value. It can also include a hyperparameter-optimization unit for optimizing the hyperparameters, a kernel-matrix-computation unit for computing a kernel matrix, and a parameter-computation unit for calculating the parameters of the regression equation such as regression coefficients and variance-covariance matrix.

In the present disclosure, a computer-readable program can also be provided for executing the method described above in a computer, and enabling the computer to function as the system described above. The program can be stored in a server device or database connected to a network, and provided in response to a download request. It can also be stored and provided on a recording medium such as a CD-ROM, SD card, DVD or flash memory.

FIG. 1 is a diagram showing an example of a hardware configuration for a system in accordance with an exemplary embodiment. This system 100 can be a personal computer or workstation, and can include a CPU 102, RAM 104 and ROM 106 used as the main memory devices, a hard disk drive (HDD) 108, input devices 110 such as a keyboard and mouse, and a display device 112 such as a display. These components are connected to a system bus 114 so that data can be exchanged via the system bus 114.

Preferably, the CPU 102 is able to handle 32 bits or 64 bits of data at one time. Examples include Core™ and Pentium™ from Intel Corporation, and Phenom™ and Athlon™ from AMD Corporation. RAM 104 is a memory device that can be read from and written to directly by the CPU 102. The capacity should be at least 1 GB. Because the method of the present disclosure does not include complicated feature vector calculations, the number of calculations is reduced. However, a capacity of at least 2 GB is preferred in order to improve the calculation speed.

ROM 106 is read-only memory, and stores BIOS (basic input/output system) and firmware. The HDD 108 stores various types of application software and the operating system (OS). The OS can be any operating system compatible with the CPU 102, such as UNIX™, Linux™, Windows™, or MacOS™.

Also, the program for executing the method of the present disclosure can be stored in the HDD 108. This program can be read to the RAM 104 by the CPU 102 and executed by the CPU 102 to realize the process described below. This program can be written in any well-known programming language such as C, C++, C# or Java™.

The input device 110 can be used to manipulate graphic objects such as icons, task bars and windows displayed on the screen of a display device 112 in accordance with the graphic user interface (GUI) provided by the OS or to enter characters and numbers. The input device 110 is used to press command buttons displayed on the screen of the display device 112. The process can be started, paused and ended by pressing command buttons.

The display device 112 can be a liquid crystal display and can have a touch panel installed. When the display device 112 has a touch panel, operations are performed and characters entered by touching the screen. An input device 110 such as the one described above is not required in this case.

If necessary, a communication interface connected to a network, a DVD drive, and/or an SD card slot can be installed. The system can also include a transceiver so as to enable to realize a wireless LAN function or a Bluetooth™ function.

Figure 2:
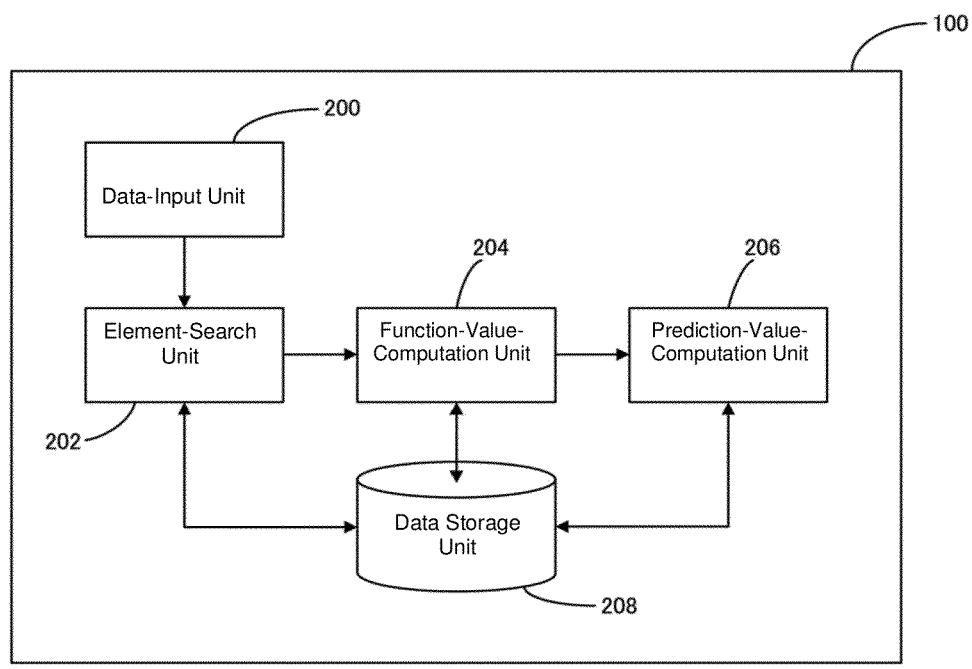
FIG. 2 is a functional block diagram showing a first embodiment of the system in FIG. 1.

FIG. 2 is a functional block diagram showing a first embodiment of a system for embodying the method of the present disclosure. This system 100 includes a CPU 102, RAM 104 and HDD 108 as mentioned above. The program for executing the method of the present disclosure is stored in the HDD 108, which is read by the CPU 102 to the RAM 104 and executed so that the system 100 can function as the various functional units described below.

Functional units of the system 100 include a data-input unit 200, an element-search unit 202, a function-value-computation unit 204, and a prediction-value-computation unit 206. The system 100 also includes the RAM 104 and HDD 108 as a data storage unit 208.

The data-input unit 200 receives an instance of input data using the input device 110. The input data is received via a network when the system 100 is connected to a network, and/or is stored in a recording medium such as a CD-ROM.

The input data are explanatory variables for predicting the output variable. For example, when the method of the present disclosure is used to predict the amount of electric power consumed by a manufacturer to melt and mold raw materials into products, the output variable is power consumption, and the explanatory variables are manufacturing conditions such as the physical properties, volume and mass of the raw materials, as well as the temperature and pressure.

In the example of the steel plant explained in detail below, raw material such as iron ore, coal and limestone are received, the raw materials are fired and melted in a furnace to extract the iron, the resulting iron is mixed if necessary with other metals or alloys, and steel of a predetermined strength is manufactured. It can also be cast in a certain shape to make it easier to process. When this steel is manufactured, an electric furnace is used. The amount of power consumed by this electric furnace depends on the raw materials included. The same is true during rolling when the final product is processed.

Therefore, explanatory variables in the steel manufacturing process include the types and number of raw materials such as iron, carbon, nickel and chromium, the volume and mass of each raw material, the temperature of the furnace, and the thermal conductivity of the raw materials. In the rolling process, the explanatory variables include the types and number of raw materials, the volume and mass of each raw material, the modulus of elasticity of each raw material, and the pressure applied to the raw materials.

Among these explanatory variables, the volume and mass of the raw materials, the temperature, pressure, modulus of elasticity and thermal conductivity are continuous variables whose precision in measurement can become as high as possible depending on the precision of measurement devices. Meanwhile, the types and number of raw materials such as iron, carbon, nickel and chromium are discrete variables which cannot be divided further. Continuous variables are obtained as multidimensional vectors in response to the number of continuous values such as the entered physical properties and volume. Values that are roughly proportional to the output variable, which is a result of calculation based on an equation including the volume and mass or another variable and a plurality of variables, thereof are scale variables representing a scalar corresponding to the amount of power consumed.

When the data-input unit 200 receives, as input data, explanatory variables given as a set which is a combination of these continuous variables and discrete variables, the explanatory variables are sent to the element search unit 202. The explanatory variables are combinations of discrete variables and continuous variables because the iron raw material has discrete variables expressing the type of iron raw material and continuous variables such as the physical properties (density, modulus of elasticity, thermal conductivity, etc.), volume, mass, applied pressure, and temperature. Because similar combinations are used in the case of carbon, nickel and chromium, etc., the variables are provided as sets of combinations.

The present disclosure is designed to predict an output variable based on explanatory variables including both continuous variables and discrete variables, where scalars being roughly proportional to the output variable are also incorporated.

The element-search unit 202 searches each element in the sets included in the input data for elements with matching discrete variables in the plurality of sets in the training data. This is because the output variable can be predicted also with each individual element. Here, an element is a combination of discrete variables and continuous variables. More specifically, it is data such as the physical properties, volume and mass of each raw material such as iron. The training data includes pairs of the output variables which have actually been measured and observed, and explanatory variables used to observe these output variables. This data is stored in the data storage unit 208.

The data storage unit 208 can store these pairs as tables. Specifically, output variables which have been observed include power consumption that is measured actually with a power meter. The data storage unit 208 also stores the functions and prediction equations described below as data to be read and used when necessary.

Because the training data contains pairs of explanatory variables and corresponding output variables that have been observed and because the explanatory variables are provided as sets of one or more elements, the element-search unit 202 searches each of the elements in the input data to find elements with matching discrete variables from the plurality of sets in the training data. If the discrete variable represents a type of raw material such as iron, it searches for elements with a value representing a type of raw material such as iron as a discrete variable among the plurality of sets in the training data. Because these elements are combinations of discrete variables and continuous variables, they are extracted as data pairings.

The function-value-computation unit 204 applies a function giving the degree of similarity between two sets weighed by a scale variable that is roughly proportional to the output variable and is obtained from the continuous variables. The function-value-calculating unit 204 then calculates the sum of the calculated function values. The function-value-calculating unit 204 performs this calculation on all of the elements in the input data.

The function used in unit 204 is weighed with a scale variable. It can be, for example, a kernel function weighted using the scale variable. Because a single function value is calculated between an element in the input data and a single searched element, more than one function value is calculated between more than one element. Because the sum of more than one function values is calculated for each element in the input data, the sum is obtained based simply on the number of elements in the input data.

The sum calculated in this manner is sent to the prediction-value-computation unit 206. The prediction-value-computation unit 206 plugs the sum of these function values into a prediction equation for predicting an output variable, and prediction values of the output variable are calculated for each element. Functions and prediction equations that can actually be used are described in detail below.

Figure 3:
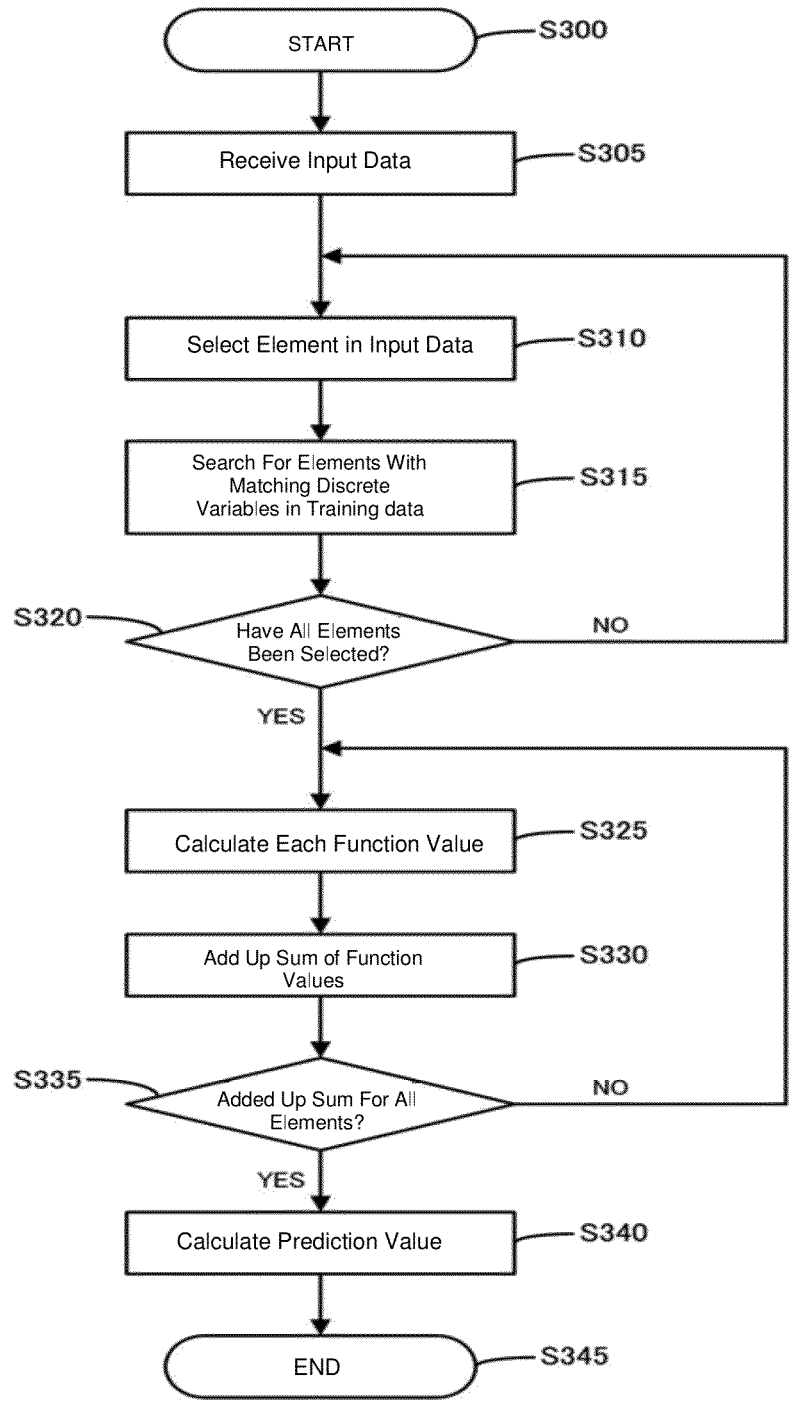
FIG. 3 is a flowchart showing the flow of the processing performed by the system in FIG. 2.

The following is an explanation of the output value prediction process with reference to the flowchart shown in FIG. 3. The process begins in operation 300 where inputted explanatory variables for the output variable to be predicted are received. In operation 305, the inputted explanatory variables are received by the data-input unit 200. When the data-input unit 200 sends the inputted data to the element-search unit 202 in operation 310, the element-search unit 202 selects a single element in a set included in the input data. In operation 315, it searches for an element with a discrete variable that matches with that of the selected element in the sets of training data.

In operation 320, it determines whether or not all of the elements in the sets of the input data have been selected. If there is still an element that has not yet been selected, the process returns to operation 310 and an element that has not yet been selected is selected as the next element. When it has been determined that all elements have been selected, the process advances to operation 325 where the function-value-computation unit 204 applies a function giving the degree of similarity between two sets weighed by a scale variable representing a scalar almost proportional to the output variable obtained from continuous variables to each element in the input data, and to one or more elements found in the elements of the input data to calculate function values. In operation 330, the sum of the function values is calculated.

In operation 335, it is determined whether or not the sum of function values has been calculated for all of the elements in the input data. If it has not yet been calculated, the process returns to operation 325 and the sum of function values is calculated for the next element. When all of the calculations have been completed, the process advances to operation 340 where the prediction value calculating unit 206 applies a prediction equation for predicting the output variable and the prediction value for the output variable is calculated for each element. When this calculation has been completed, the process ends in operation 345.

In this way, a function weighted by a scalar variable being roughly proportional to the output variable is applied when discrete variables are matched to one another among elements. Then a sum is determined for all of the elements in the input data, and the sum is plugged into a prediction equation to calculate a prediction value for the output variables for each of the elements. Thus, a prediction value of the output variable can be obtained for combinations of the elements even when the combinations are not included in the training data, even when the output variables have only been partially observed, and even when the explanatory variables include discrete variables.

As another merit, a prediction value for the output variable can be obtained for individual elements using training data, even when there is not a close correspondence between individual elements and the output variable. In addition, a value of the output variable can be predicted only with small error even when elements with a different order of output variables are included.

A regression method can be used as the method for predicting a dependent variable from explanatory variables. Applicable regression methods include broad nonparametric regression or conditional density estimation methods. For example, a Gaussian process regression can be used. In a Gaussian process, there is a set of stochastic variables and the joint distribution is a Gaussian distribution no matter how many stochastic variables there are. A prediction equation described above can be used as the regression equation in a Gaussian process regression. A specific calculation method using a Gaussian process regression is explained below.

Other examples include Nadaraya-Watson kernel regression using RBF kernels, Relevance vector regression, Support vector regression, the Kullback-Leibler importance estimation procedure, and Least-Square conditional density estimator.

Because these regression methods exploit computations of kernel matrix and kernel vectors, and because these methods are well known to data mining communities, a detailed explanation has been omitted. These methods are only examples. Any regression method can be used as long as it includes kernel matrix and kernel vector calculations.

Figure 4:
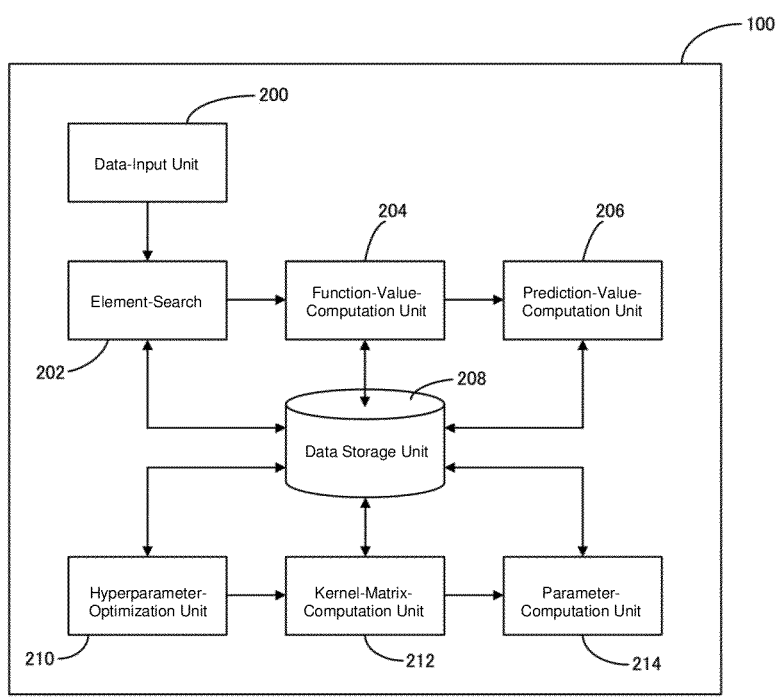
FIG. 4 is a functional block diagram showing a second embodiment of the system in FIG. 1.

A kernel function is used for predicting an output variable with Gaussian process regression. This kernel function includes one or a plurality of hyperparameters, but these hyperparameters have to be optimized in advance using training data. As a result, the system 100, as shown in FIG. 4, has functional units for optimizing these hyperparameters in addition to the data-input unit 200, the element-search unit 202, the function-value-computation unit 204, the prediction-value-computation unit 206, and the data storage unit 208.

In system 100, these functional units are a hyperparameter-optimization unit 210 for optimizing the hyperparameters, a kernel-matrix-computation unit 212 for computing a kernel matrix based on the optimized hyperparameters of the kernel function, and a parameter-computation unit 214 for calculating parameters of the regression equation based on the kernel matrix.

Figure 5:
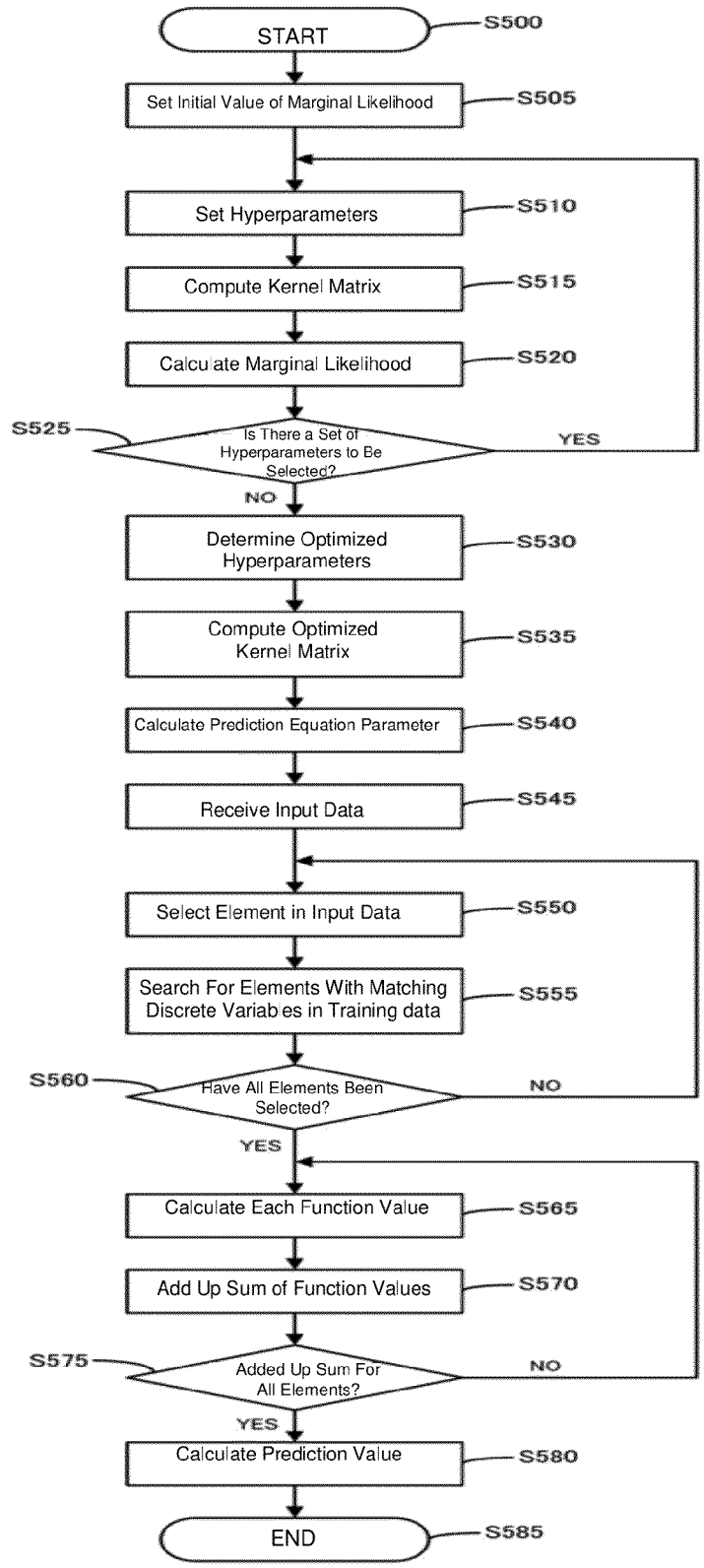
FIG. 5 is a flowchart showing the flow of the processing performed by the system in FIG. 4.

The process to predict output variables, which includes the actions performed with the hyperparameter-optimization unit 210, the kernel-matrix-computation unit 212 and the parameter-computation unit 214, will be explained below with reference to the flowchart in FIG. 5. In FIG. 5, the same prediction processing as that shown in FIG. 3 is performed after these units have completed their actions. The actions performed with the hyperparameter-optimization unit 210 and the other units is executed after the input data has been received. Afterwards, the processing beginning with an element search can be executed. In the following explanation, the optimization is performed based on the maximization of marginal likelihood in Gaussian process regression.

Here, marginal likelihood is the amount of likelihood applied to the regression equation and distribution of training data, and the maximum marginal likelihood method is a method for estimating values of the hyperparameters in a kernel function, with maximizing the value of the marginal likelihood. Therefore, optimized hyperparameters are given with the maximum marginal likelihood method.

The processing shown in FIG. 5 is started at operation 500. In operation 505, the hyperparameter-optimization unit 210 sets the initial value of the marginal likelihood. In operation 510, a combination of the hyperparameters is selected. The initial values of the hyperparameters are set in advance. Selection of the hyperparameters can be performed with selecting set values one at a time in the arrayed order.

In operation 515, the hyperparameter-optimization unit 210 instructs the kernel-matrix-computation unit 212, and the kernel-matrix-computation unit 212 uses a kernel function weighted with a scale variable similar to the one described above to obtain function values for elements with matching discrete variables, and the sum of these function values is calculated for all of the elements to derive a kernel matrix. In the above description, the function values were calculated using the same discrete variables shared between the input data and training data. Here, the function values are calculated using the same discrete variables only among the training data, the sum of these function values is calculated, and a kernel matrix is calculated. At this time, the kernel-matrix-computation unit 212 calculates a diagonal element for each set in the training data using the plurality of scale variables included in the sets, and a diagonal matrix is calculated.

In operation 520, the kernel-matrix-computation unit 212 calculates the marginal likelihood using the calculated kernel matrix and diagonal matrix. The function for calculating the marginal likelihood is provided as an equation including the hyperparameters, the kernel matrix and the diagonal matrix. The marginal likelihood is computed with the selected hyperparameters, the computed kernel matrix, and diagonal matrix.

In operation 525, the hyperparameter-optimization unit 210 determines whether or not there is still a combination of hyperparameters to be selected. If there is still another combination, the process returns to operation 510 and the next combination is selected. If it has been determined that all of the combinations have been tested, the process advances to operation 530 where the hyperparameter-optimization unit 210 adopts the optimum set of hyperparameters having the maximum value of the marginal likelihood.

The hyperparameter-optimization unit 210 sends the optimized set of the hyperparameters to the kernel-matrix-computation unit 212. In operation 535, the kernel-matrix-computation unit 212 computes the optimized kernel matrix. At this time, the kernel-matrix-computation unit 212 also computes an optimized diagonal matrix. In operation 540, the parameter-computation unit 214 uses the optimized kernel matrix and diagonal matrix to calculate parameters of the prediction equation. These parameters are set in the prediction equation and used to calculate prediction values for the output variable.

Operation 545 through operation 580 are the same as operation 305 to operation 340 shown in FIG. 3. When the prediction values have been calculated in operation 580, the process advances to operation 585, and the processing is ended.

The method of the present disclosure and a system for embodying this method were explained above. The actual calculation of each value using functions and prediction equations will be explained in detail below. The prediction power consumed when a plurality of raw materials are melted and molded to manufacture a product will be explained. However, the present disclosure is not limited to this example. For example, the present disclosure can be applied to predict purchasing power where the explanatory variables are the number of persons in a household, age and annual income, and the output variable is the purchasing power of a household represented by a numerical value.

The actual measurement of power consumption is performed on each unit at, for example, 30-minute intervals. A 30-minute interval is used here, but a one-hour or two-hour interval can also be used. It can also be applied to each process such as the rolling process. Each unit has a different type of raw materials to process and a different number of raw materials to process. Even when the same raw materials are used in a plurality of units, the volume would be different. If training data contains all combinations of types and numbers of raw materials and their corresponding powers consumed, slight differences in magnitude can be predicted. However, it is difficult to have training data for all combinations in reality, and this is not reasonable given the amount of storage capacity available in memory. Therefore, the power consumption of each unit is predicted in the following way.

First, as a definition, if can be expressed as shown in Equation 1, where the number of units is n, and the unit in which the total value of power consumed has been observed is i. Because one or more raw materials are processed in unit i, only the total value of power consumed by all of the raw materials has been observed. In Equation 1, unit i can be any unit from unit 1 to unit n.

$$i \in \{1, 2, \ldots, n\} \quad \text{Equation 1}$$

When the number of raw materials included in unit i is m[i], the vector xij containing the every quantity of continuous variables among the explanatory variables related to the $j^{th}$ raw material included in unit i can be represented as a d-dimensional vector with Equation 2. In Equation 2, d represents the dimension of the continuous variable input, and Rd represents the d-dimension vector space.

$$\{x_{ij} \in R^d\}_{j=1}^{m[i]} \quad \text{Equation 2}$$

The raw materials are, for example, iron, carbon, nickel, chromium, etc. The explanatory variables related to these raw materials are variables for predicting power consumption, which is the output variable. More specifically, these explanatory variables are physical properties such as the modulus of elasticity, volume, mass, and pressure applied to the materials. The explanatory variables include the types and number of raw materials. However, these are discrete variables which cannot be separated into more units. The discrete variable zij related to the $j^{th}$ raw material included in unit i can be represented as shown in Equation 3 where M is the number of the types of raw materials included in unit i. In Equation 3, discrete variable zij represents any integer from 1 to M.

$$z_{ij} \in \{1, 2, \ldots, M\} \quad \text{Equation 3}$$

Also, the explanatory variables include volume and mass. In addition, certain scale variables are contained in these explanatory variables, where each scale variable is roughly proportional to the power consumption, and is determined with a function of all of the other explanatory variables. The scale variable sij related to the $j^{th}$ raw material included in unit i can be represented as shown in Equation 4. In Equation 4, R+ represents the space of non-negative real value.

$$\{s_{ij} \in R_+\}_{j=1}^{m[i]} \quad \text{Equation 4}$$

The power consumption yij needed to process the $j^{th}$ raw material in unit i has not been observed, but the total power consumption yi needed by unit i can be observed, and an $n^{th}$ dimension vector y including y1 to yn in the components can be expressed as shown in Equation 5. In Equation 5, $R^n$ represents is the n-dimensional vector space, and T represents the transposition of matrix or vector. In other words, y is an n-dimensional column vector. Note that transposition of a matrix is a matrix whose (a,b)-th element is the (b, a)-th element of the original matrix.

$$y \in R^n = \left( \sum_{j=1}^{m[1]} y_{1j}, \sum_{j=1}^{m[2]} y_{2j}, \ldots, \sum_{j=1}^{m[n]} y_{nj} \right)^T \quad \text{Equation 5}$$

As shown in Equation 6, the training data includes the observed total power consumption vector y, and all sets of continuous explanatory variables xij, discrete variables zij, and scale variables sij. The regression function f in Equation 7 can be fitted or the conditional density function g in Equation 8 is fitted with on these variables. In Equation 7, $\epsilon$ is a zero-mean noise variable. Equation 8 is an equation to give a probability density function of the output variable Y conditional on explanatory variable X and parameter $\Theta$. With using the fitted function for function g, a predicted value of the power consumption yij related to the $j^{th}$ raw material included in unit i is computed.

$$y_i, \{(x_{i1}, z_{i1}, s_{i1}), \ldots, (x_{im[i]}, z_{im[i]}, s_{im[i]})\}_{i=1}^n \quad \text{Equation 6}$$

$$Y = f(X) + \epsilon \quad \text{Equation 7}$$

$$P(Y|X) = g(Y|X, \Theta) \quad \text{Equation 8}$$

The following supplements the mathematical derivation of the proposed kernel function used in the present disclosure. In this explanation, the calculation method is used in a situation in which the method has been applied to regression analysis. In other words, an example of regression method based on Equation 7 is provided. Examples using the conditional density estimation with Equation 8 are omitted here. Estimation with Equation 7 is reduced to a linear regression problem to optimize the regression coefficient vector wφ in Equation 9, using high-dimensional feature vector ψ(x, z).

The high-dimensional feature vector ψ(x, z) is virtually provided with a non-linear transformation of the continuous explanatory variables x and discrete explanatory variable z. In Equation 9, $\epsilon$ is a zero-mean noise variable, and wφ is a high-dimensional vector of coefficients. In the present disclosure, as shown in Equation 9, the mapping function term and noise term are both multiplied by the scale variable s, and weighted.

$$y = w_\phi^T s \phi(x,z) + s\epsilon \quad \text{Equation 9}$$

When Equation 9 is applied to a specific unit i and the sum of Equation 9 is obtained for the m[i] materials in the unit, Equation 10 below is satisfied.

$$\sum_{j=1}^{m[i]} y_{ij} = w_\phi^T \sum_{j=1}^{m[i]} s_{ij} \varphi(x_{ij}, z_{ij}) + \sum_{j=1}^{m[i]} s_{ij} \varepsilon_{ij} \quad \text{Equation 10}$$

Given Equation 10, an example of regression method that has statistical consistency can be designed, where the sum of the total power consumption vector y in the unit and the sum of the feature vector ψ(x, z) are regarded as training data. With applying the least square principle, the regression coefficients fitted with n training samples converge to their true values if n is sufficiently large.

In primal forms of non-linear regression, the high-dimensional feature vector ψ(x, z) itself is designed first, and then the regression coefficient vector wφ is explicitly estimated from the data. However, in kernel regression analysis adopting dual forms and used in the present disclosure, a kernel function that determines the inner product for a pair of feature vectors is designed, while explicit design of the high-dimensional feature vector ψ(x, z) is not required. Since only the inner product between the coefficient vector wφ and the feature vector ψ(x, z) is calculated based on the kernel function, the regression function vector wφ. is not explicitly calculated in the present disclosure. The left side of Equation 11 represents the inner product of feature vectors in which scale correction has been performed with respect to unit i and unit j. The right side of Equation 11 means the value of the inner product. Equation 11 can be used as a new kernel function between two sets of explanatory variables, where various combinations of both the continuous and discrete explanatory variables can be directly incorporated.

$$\left\langle \sum_{l=1}^{m[i]} s_{il} \varphi(x_{il}, z_{il}), \sum_{k=1}^{m[j]} s_{jk} \varphi(x_{jk}, z_{jk}) \right\rangle \equiv \quad \text{Equation 11}$$

$$K(\{x_{il}, z_{il}, s_{il}\}_{l=1}^{m[i]}, \{x_{jk}, z_{jk}, s_{jk}\}_{k=1}^{m[j]})$$

The derivation of the original kernel function used in the present disclosure will now be explained. M types of high-dimensional feature vectors ψ1(x), ..., ψM(x) corresponding to the M types of raw materials are considered. When these M high-dimensional feature vectors have been multiplied by the scale variables and aligned horizontally, the mapping function ψ for calculating the further high-dimensional feature vectors can be defined as shown in Equation 12. I(z=k) is 1 when z=k. Otherwise, the function has a value of zero. k is an integer from 1 to M.

$$\phi(x,z,s) = s [I(z=1)\phi_1(x)^T, \ldots, I(z=M)\phi_M(x)^T] \quad \text{Equation 12}$$

Generally, if both of two input materials is associated with the index k, one material has continuous variables x1, the other material has continuous variables x2, then the inner product between two high-dimension vectors ψk(x1) and ψk(x2) is defined as a kernel function κk(x1, x2). Designing high-dimensional vector ψk(x) is not simple, but a linear kernel, polynomial kernel or RBF kernel from the existing literature can be used for the kernel function κk(x1, x2). Thus, it is relatively easy for technician to specify the kernel function κk(x1, x2). Because the relationship between the types of raw materials, the physical properties of the raw materials and the total power consumed cannot be defined as a linear model, it is defined as a non-linear model. As a result, a non-linear kernel function such as an RBF kernel is adopted in real. The equation can be given, for example as Equation 13. αk, γk are the respective hyperparameters, which have to be optimized, for example, with the maximum marginal likelihood method.

$$K_k(x_1, x_2) = \alpha_k \exp(-\gamma_k \|x_1 - x_2\|^2) \quad \text{Equation 13}$$

When the kernel function κk(x1, x2) is used and an ultra-high-dimensional vector is calculated for unit i and unit j using Equation 12, the inner product of both can be calculated as shown in Equation 14. Equation 14 is the definition of the kernel function giving the degree of similarity between unit i and unit j, whose power consumption has been observed.

$$K(\{x_{i1}, x_{i2}, \ldots, x_{im[i]}\}, \{x_{j1}, x_{j2}, \ldots, x_{jm[j]}\}) = \quad \text{Equation 14}$$

$$\sum_{k=1}^{M} \sum_{t=1}^{m[i]} \sum_{u=1}^{m[j]} s_{it} s_{ju} I(z_{it} = z_{ju} = k) \kappa_k(x_{it}, x_{ju})$$

Here, m[i] and m[j] are the number of raw materials included in unit i and unit j whose power consumption has been observed, M is the number of the types of raw materials, s is a value roughly proportional to the output variable and calculated with an equation including the volume and mass or another variable and a plurality of variables thereof, z is a value representing the type of raw material, x is a vector summarizing continuous quantities related to a raw material, and I is a function that is "1" only when the raw materials in unit i and unit j are the same but otherwise "0".

Thus, the power consumption can be predicted using various types of kernel regression methods such as Gaussian process regression or Nadaraya-Watson kernel regression if there is a kernel represented with Equation 14 and a power consumption vector y required by an actual unit.

The following is a detailed explanation of the calculation method when Gaussian process regression is used which is provided as a specific example of implementation. This method is an example, so the calculation can naturally be performed using any of the methods described above. Other methods can be used to the extent that the operations and effects of the present disclosure are realized.

When Gaussian process regression is used, the hyperparameters of the kernel is first optimized using the maximum marginal likelihood method. The hyperparameters represent the content of the training data and its reliability, and include band width $\gamma$, which represents the size of the spread of the kernel function, and noise $\sigma^2$.

In the optimization, $-\infty$ is assigned to Lmax as the initial value, and hyperparameters $\gamma$, $\sigma^2$ are selected from predetermined values. Then, $L(\sigma^2, \gamma)$ is calculated in Equations 15-17 using hyperparameters $\gamma$, $\sigma^2$, the plurality of explanatory variables included in the training data, and the plurality of actually observed values of the output variable from the plurality of explanatory variables. In other words, the calculation is performed using values representing the types of raw materials in the training data, the number of raw materials, a vector summarizing the continuous quantities, a value roughly proportional to the output variable calculated with an equation including the volume and mass or another variable and a plurality of variables thereof, and a vector of the observed total power consumption.

Equation 15 is an equation obtained by transforming the kernel function used in Equation 13 and Equation 14, and is weighted with scale variables. It is designed to calculate only for the elements sharing the same discrete variables, representing the same raw materials. Values $\kappa\gamma$, ij obtained in Equation 15 are matrix elements inside n×n matrix $K\gamma$. An n×n matrix is a matrix with n rows and n columns.

Equation 16 is an equation used to obtain each diagonal element of n×n diagonal matrix R=diag(r1, . . . , rn) utilized in Gaussian process regression. The n×n matrix $K\gamma$ and n×n diagonal matrix R obtained in this manner are used to compute Equation 17, which is conditional on the selected $\sigma^2$ and the power-consumption vector y. The calculated value of the function $L(\sigma^2, \gamma)$ is compared to Lmax, and Lmax is updated by that value of $L(\sigma^2, \gamma)$ if it is greater than the old value of Lmax. The update of Lmax is repeated until all of the hyperparameter combinations are tested. Then the values of $\gamma$, $\sigma^2$ giving $L(\sigma^2, \gamma)$=Lmax are set as optimized hyperparameters $\gamma^*$, $\sigma^{2*}$.

$$\kappa_{\gamma,ij} = \sum_{k=1}^{M} \sum_{t=1}^{m[i]} \sum_{u=1}^{m[j]} s_{it} s_{ju} I(z_{it} = z_{ju} = k) \exp(-\gamma\|x_{it} - x_{ju}\|^2) \quad \text{Equation 15}$$

$$r_i = \sqrt{\sum_{t=1}^{m[i]} s_{it}^2} \quad \text{Equation 16}$$

$$L(\sigma^{2\sigma}, \gamma) = \quad \text{Equation 17}$$
$$-\frac{n}{2}\log 2\pi - \frac{1}{2}\log|K_\gamma + \sigma^2 R^2| - \frac{1}{2}y^T(K_\gamma + \sigma^2 R^2)^{-1} y$$

The matrix inversion to compute $(K\gamma+\sigma^2 R2)-1$ does not have to be performed every time, because $\sigma^2$ is efficiently optimized with Eigen decomposition of the matrix $K\gamma$, as long as the bandwidth hyperparameter of $K\gamma$ is the same. The newly calculated matrix from the eigenvalue decomposition is described in Equation 18.

$$R^{-1} K_\gamma R^{-1} = U_\gamma \text{diag}(\lambda_{\gamma,1}, \lambda_{\gamma,2}, \ldots, \lambda_{\gamma,n}) U_\gamma^T \quad \text{Equation 18}$$

In Equation 18, $U\gamma$ is a unitary matrix. The inner product of this $U\gamma$ with its transposed matrix $U\gamma^T$ becomes unit matrix I. Also, $\lambda\gamma$ is an eigenvalue. For example, vector t is a function of the diagonal matrix R in Equation 19 and total power consumption vector y, vector $v\gamma$ is a function of the unitary matrix in Equation 20 and vector t, and diagonal matrices Mr, $\sigma^2$ are functions of the eigenvalue in Equation 21 and $\sigma^2$. Thus, Equation 18 can be replaced as shown in Equation 22.

$$t = R^{-1} y \quad \text{Equation 19}$$

$$v_\gamma = U_\gamma^T t$$

$$M_{r,\sigma^2} = \text{diag}\left(\frac{\lambda_1}{\lambda_1 + \sigma^2}, \ldots, \frac{\lambda_n}{\lambda_2 + \sigma^2}\right) \quad \text{Equation 21}$$

$$L(\sigma^2, \gamma) = -\frac{1}{2}\log 2\pi - \quad \text{Equation 22}$$
$$\frac{1}{2}\sum_{i=1}^{n}[\log r_i^2 + \log(\sigma^2 + \lambda_i)] - \frac{1}{2\sigma^2}(t^T t - v_\gamma^T M_{r,\sigma^2} v_\gamma)$$

In Equation 22, the value of $L(\sigma^2,\gamma)$ can be obtained simply by using ri obtained in Equation 16, vector t obtained in Equation 19, vector $v\gamma$ obtained in Equation 20, and the diagonal matrix Mr obtained in Equation 21, and the noise level $\sigma^2$.

Next, the inverse matrix J is calculated in Equation 23 below using the optimized hyperparameters $\gamma^*$ and $\sigma^{2*}$. The vector w which is the parameter described above is calculated in Equation 24 using this inverse matrix J and the total power consumption vector y. The n×n matrix $K\gamma^*$ in Equation 23 is an n×n matrix in which the elements $k\gamma^*$,ij are obtained in Equation 15 using the optimized hyperparameter $\gamma^*$. Equation 23 can be replaced as shown in its right-side, using the unitary matrix $U\gamma^*$, the diagonal matrix $M\gamma^*$, and $\sigma^{2*}$.

$$J = (K_{\gamma^*} + \sigma^{2^*} R^2)^{-1} \equiv \frac{1}{\sigma^{2^*}} \left( R^{-2} - (R^{-1} U_{\gamma^*}) M_{\gamma^*, \sigma^{2^*}} (R^{-1} U_{\gamma^*})^T \right)$$

Equation 23

$$w = Jy$$

Equation 24

After determining the vector w, the actual power consumption of the unit to be predicted is determined. When the characteristics of the unit using index # are given as (x#1, z#1, s#1), (x#m#, z#m#, s#m#), Equation 25 and Equation 26 below are used to calculate vector k# and scale r#. In Equation 25, m# is the number of raw materials in the unit to be predicted, and x#t is a vector summarizing the continuous variables among the explanatory variables related to the $t^{th}$ raw material in the unit. Also, z#t is a discrete variable related to the $t^{th}$ raw material in the unit (type of raw material), and s#t is the scale variable related to the $t^{th}$ raw material in the unit (value roughly proportional to the output variable and calculated with an equation including the volume and mass or another variable and a plurality of variables thereof).

$$\kappa_{\#j} = \sum_{k=1}^{M} \sum_{t=1}^{m\#} \sum_{u=1}^{m[j]} s_{\#t} s_{ju} I(z_{\#t} = z_{ju} = k) \exp(-\gamma^* \| x_{\#t} - x_{ju} \|^2)$$

Equation 25

$$r_{\#} = \sqrt{\sum_{t=1}^{m\#} s_{\#t}^2}$$

Equation 26

Here, κ#j calculated in Equation 25 is the $j^{th}$ vector element of an n-dimensional vector k#. μ# in Equation 27 is the predicted expectation of the total power consumption and v# in Equation 28 is its associated variance.

$$\mu_{\#} = k_{\#}^T w$$

Equation 27

$$v_{\#} = r_{\#}^2 (\sigma^{2^*} + 1) - k_{\#}^T J k_{\#}$$

Equation 28

Figure 6:
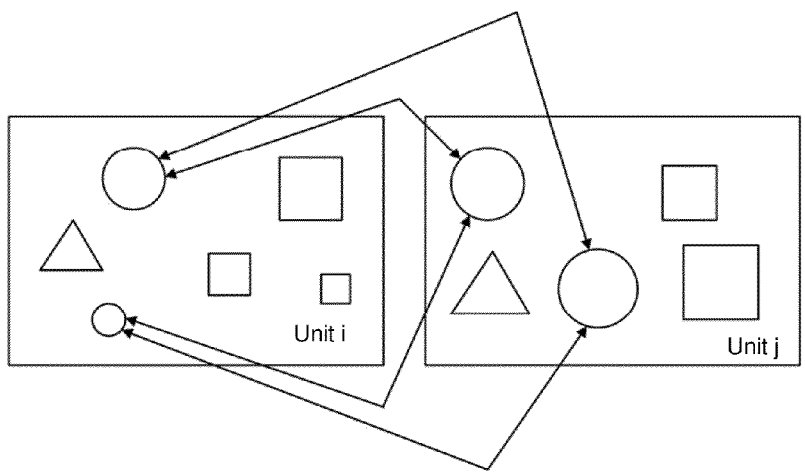
FIG. 6 is a diagram showing an example of calculation method for matrix elements in a kernel matrix and vector elements in a kernel vector.

In order to explain more clearly with reference to FIG. 6, the training data includes data such as the types of raw materials included in the plurality of units, the physical properties of these raw materials, the pressure and the total power consumption. As shown in FIG. 6 (a), unit i, which is one of the plurality of units, includes different types of raw materials expressed by circles, triangles and squares. In unit i, the same raw material is expressed by a circle with the same shape. Also, as shown in FIG. 6 (a), the volume of a raw material, which is a scalar roughly proportional to the power consumption, is expressed by the area.

In FIG. 6 (a), unit j is also indicated. The types of raw materials included in unit j are also represented by circles, triangles and squares. In unit j, types with the same shape but different areas are also included. Equation 15 is used to calculate the kernel matrix Kγ.ij between unit i and unit j. At this time, the inner products of the variously shaped elements—the round elements with the same shape as indicated by the arrows, the elements with the same triangular shape, and the elements with the same square shape—are calculated, and the inner product between unit i and unit j is the sum of all of them. This inner product is the (i,j) element in the n×n kernel matrix shown in FIG. 6 (b). To make the understanding easier, the kernel matrix is expressed in FIG. 6 (b) as a table in which the rows are indicated horizontally, and the columns are indicated vertically.

When each matrix element has been calculated in this manner, an n×n kernel matrix is obtained. This kernel matrix is used in Equation 17 through Equation 22 to calculate an optimized hyperparameters, and the optimized hyperparameters are used in Equation 23 and Equation 24, for calculating parameters in the prediction equation.

When the characteristics of a test unit whose total power consumption is to be predicted have been provided as those shown for unit i in FIG. 6 (a), the inner product between the test units and, for example, unit j in the training data is calculated. Because inner products between the test unit and each unit in the training data are used in this situation, the n×n kernel matrix described above is not obtained. Instead, 1×n vector k# is obtained.

This vector k# is plugged into Equation 27 and Equation 28 for calculating the power consumption of each raw material in the test unit, as the average μ# and the variance v#.

Here, a physical simulator of power consumption was used. The number of units was 300 or 1000 units, and from 90 different raw materials, 10 raw materials were arranged in each unit. Only the total power consumption was used as training data, and the results included individual power consumption predictions.

Five folds of cross-validation datasets were generated, where 240 or 800 units are used as training data and remaining 60 or 200 units are used as test data for each fold. Then, the error between the actually measured power consumption and the predicted power consumption was evaluated, using the Gaussian process regression method (henceforth referred to as the method) as an example of a method of the present disclosure.

The maximum marginal likelihood method was used, and the hyperparameters γ, $\sigma^2$ were optimized using only training data. Here, γ was selected from among $\{10^{-10}, 10^{-9.5}, 10^{-9}, \ldots, 10^{-0.5}, 1\}$, and $\sigma^2$ was selected from among $\{10^{-2}, 10^{-1.99}, 10^{-1.98}, \ldots, 10^{-0.01}, 1\}$. However, this selection was performed after the absolute scales of the input and output were standardized.

For the sake of comparison with the method, a conventional Gaussian process regression was used with a single RBF kernel for the vector aligning the feature quantities of each type of raw material. However, the Gaussian process regression with a single RBF kernel cannot be used when the same type of raw material is inside a plurality of units. When 90 types of raw material are selected, it is rare that the same type of raw material appears. Therefore, on the assumption that the same type of raw material was not present, the Gaussian process regression was used with the RBF kernel and a prediction was made.

Because the variance v# of the calculated prediction was different for each data, results were obtained in which the results of the error evaluation were different due to the evaluation method. FIG. 7 shows results based on three types of evaluation criteria. The three evaluation criteria adopted were average log-likelihood, mean square error, and median absolute deviation. FIG. 7 (a) shows a situation where the number of units was 300, and FIG. 7 (b) shows a situation where the number of units was 1000. Here, the average log-likelihood was the most important indicator. The performance was better when the average logarithmic likelihood was higher, and when the mean square error and the median absolute deviation were lower.

In FIG. 7 (a) and FIG. 7 (b), the average log-likelihood was high in the method, and the mean square error and the median absolute deviation were low in the method. Therefore, the performance of the method was clearly better than the conventional method in all three cases. In the simulation, the performance was better than the conventional method despite not containing the same types of raw materials in the units.

Because the method can also be applied to situations in which the units contain the same types of raw materials, it is clearly more effective than the conventional method.

Figure 8:
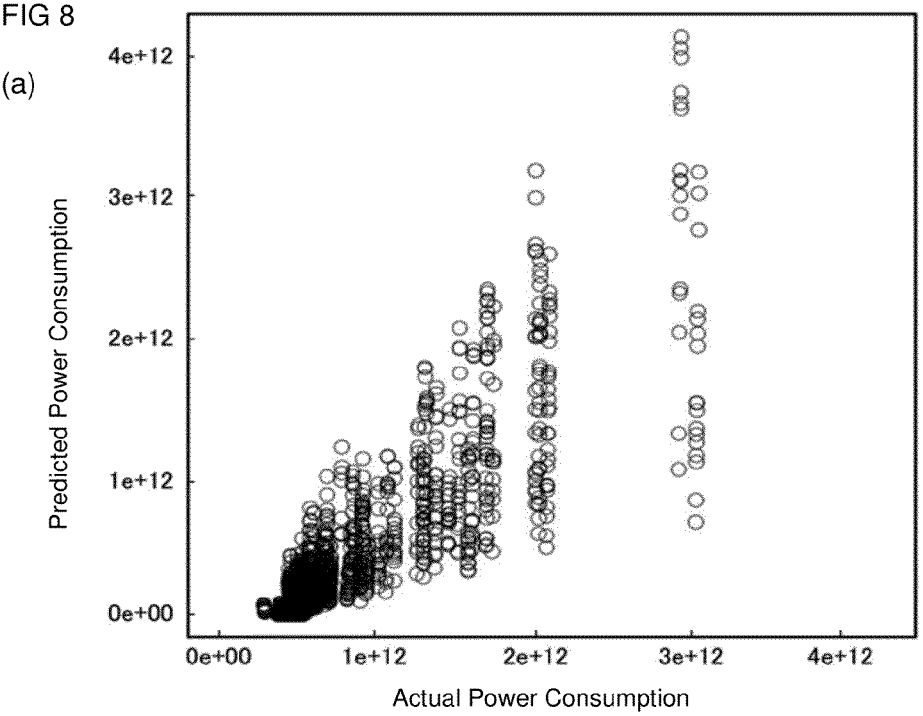
FIG. 8 is a diagram showing the relationship between predicted power consumption and actual measured power consumption for each raw material in a unit.
Figure 8:
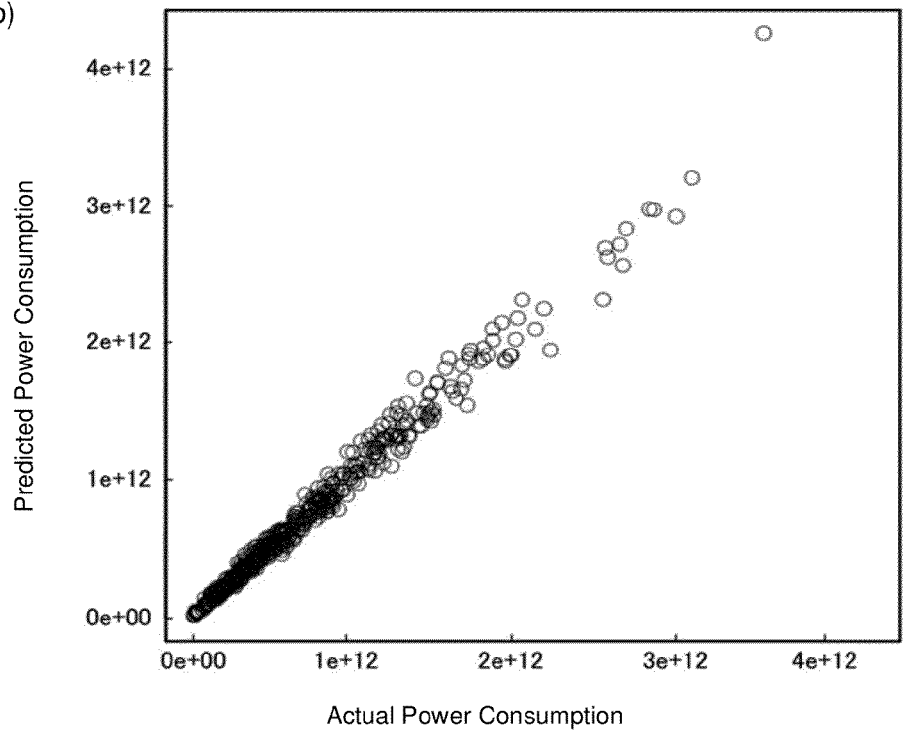
Figure 9:
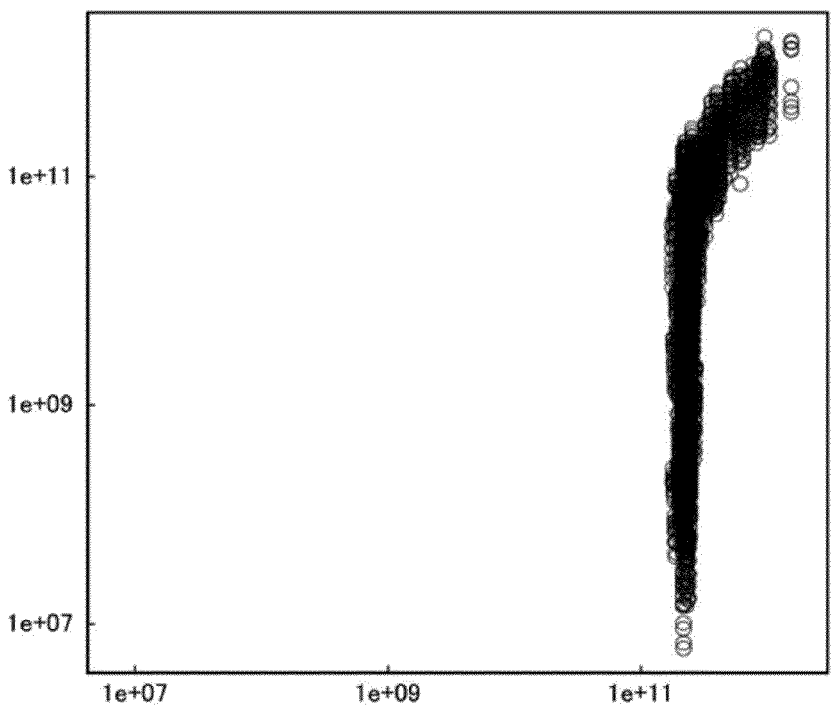
FIG. 9 is a diagram showing the prediction results and actual results in FIG. 7 plotted on a logarithmic axis.
Figure 9:
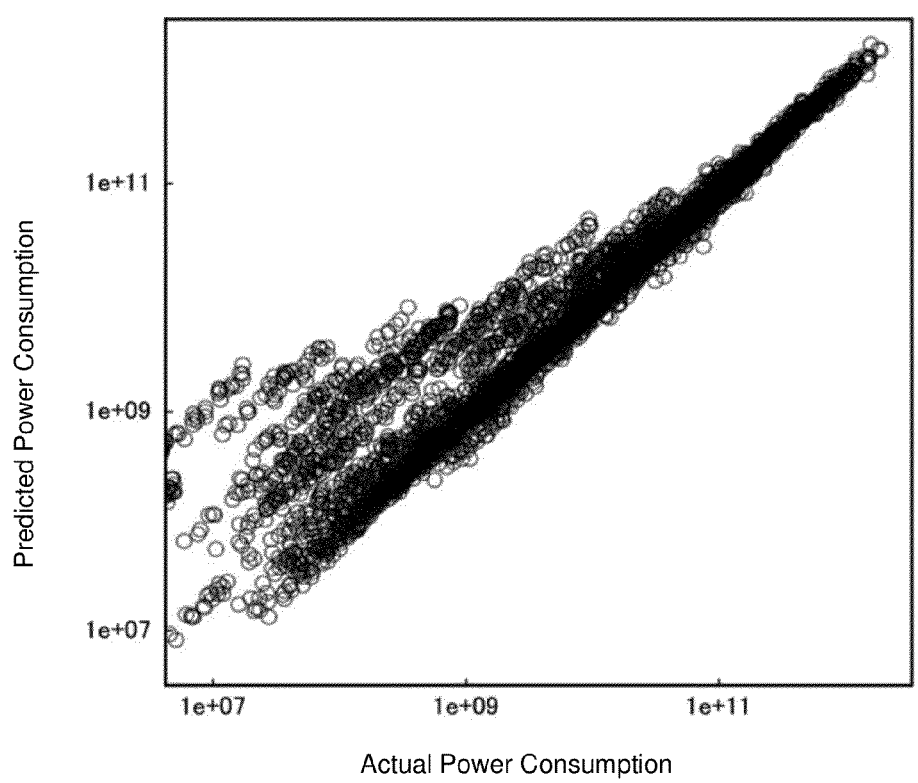

FIG. 8 and FIG. 9 show power consumption prediction results for each raw material in each unit. FIG. 8 is a graph showing the relationship between predicted power consumption and actual measured power consumption represented on a real axis. FIG. 8 (a) shows the results for the conventional method, and FIG. 8 (b) shows the results for the method. In the results of the conventional method, the data was not collected on a straight line with a 45° inclination. As the power increases, the data deviates farther from the straight line. In the results of the method, by contrast, the data is collected along the straight line. This means the predicted power consumption was nearly the same as the actual measured power consumption. In other words, the prediction results closely matched the actual results.

As well as its high average log-likelihood, the advantage of the present disclosure is also shown in FIG. 9 where the relationship between predicted power consumption and actual measured power consumption are represented on a logarithmic axis. FIG. 9 (a) shows the results for the conventional method, and FIG. 9 (b) shows the results for the method. In the results of the conventional method, only high power consumption matched a straight line with a 45° inclination. At lower power levels, hardly any predicted power consumption values represent actual measured power consumption values. This probably occurred because they could not scale to accommodate the differences in power consumption of each material in the units, and were pulled towards those with higher levels of power consumption.

In contrast, while the method varied somewhat at lower levels of power consumption, the predicted power consumption is more close to the actual measured power consumption with small errors. Therefore, the method clearly predicted power consumption in most cases using the correct scale.

What is actually important is the total amount of power consumed by each unit in the test data. Because the amount of power consumed by each raw material in a unit can be accurately predicted, the total amount of power consumed can be accurately predicted.

Figure 10:
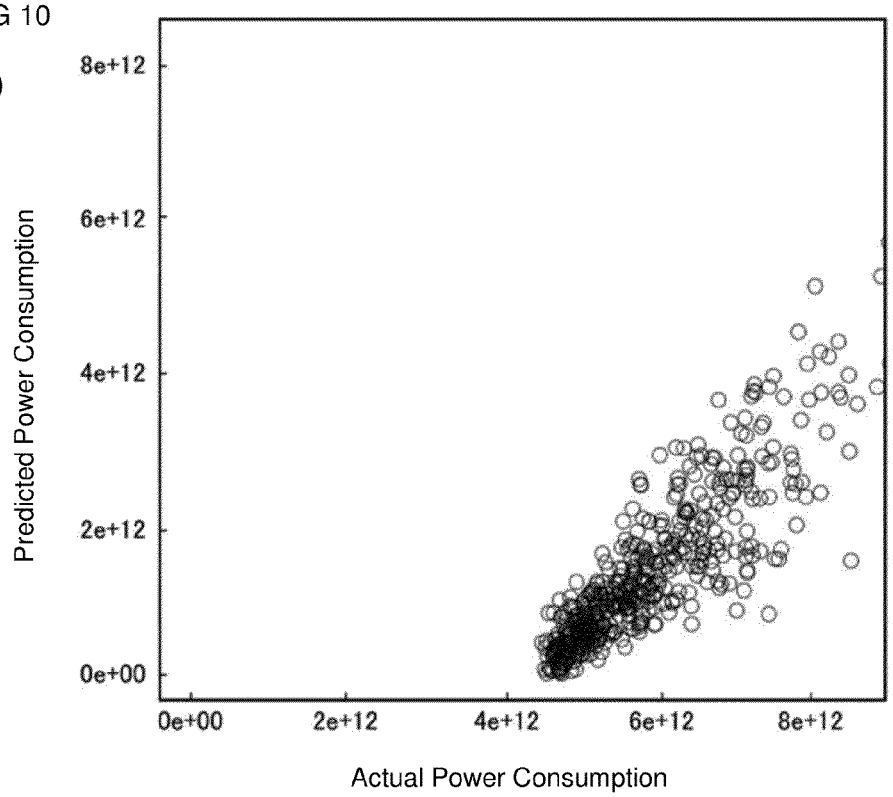
FIG. 10 is a diagram showing the relationship between the predicted total power consumption and actual measured total power consumption for all raw materials in a unit.
Figure 10:
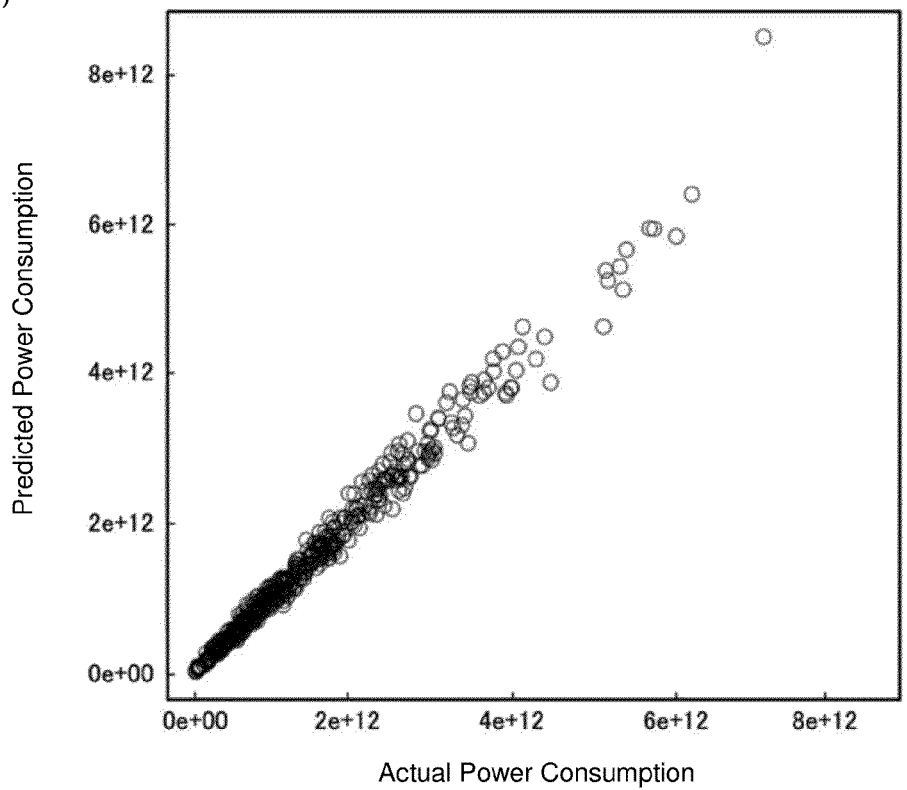
Figure 11:
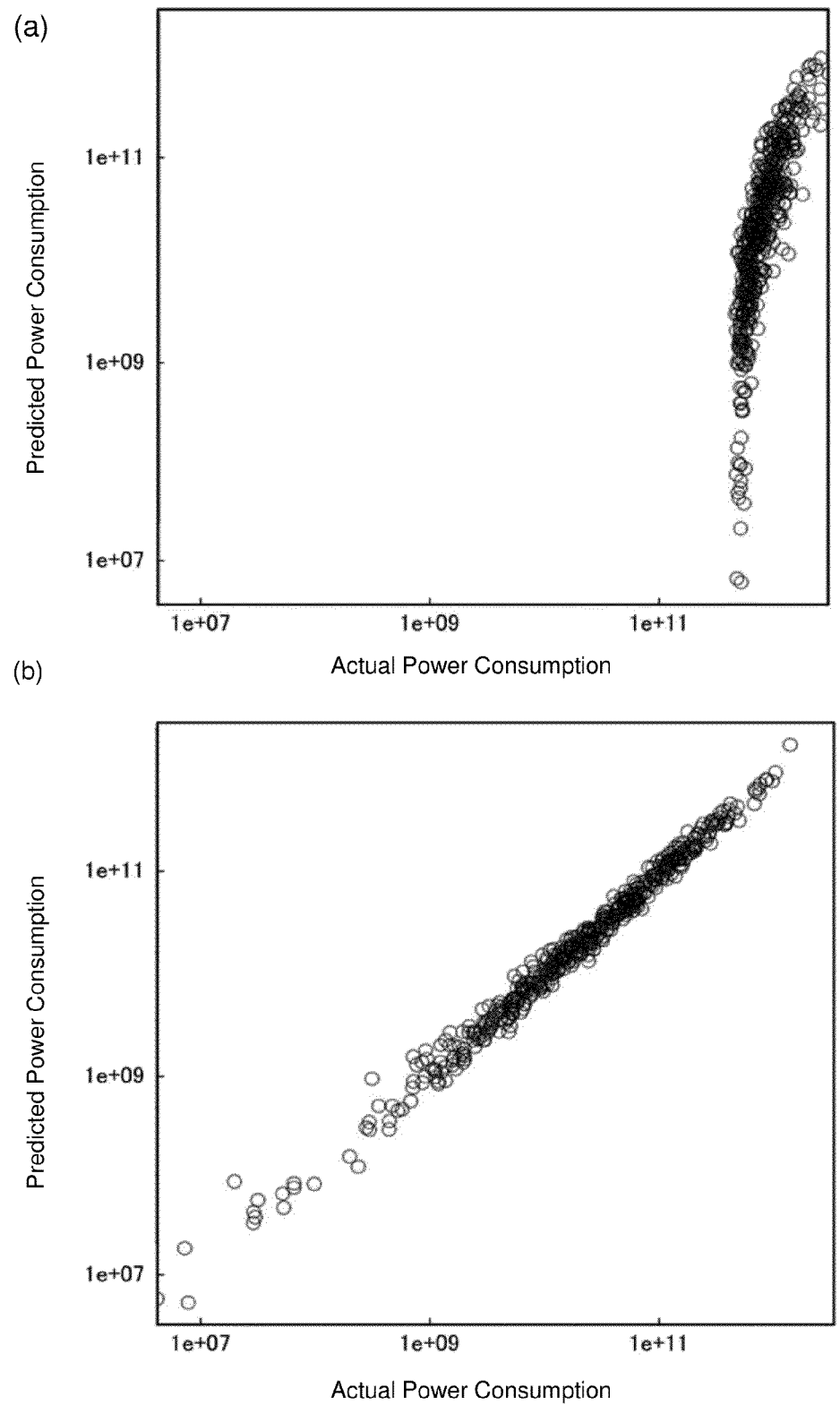
FIG. 11 is a diagram showing the prediction results and actual results in FIG. 9 plotted on a logarithmic axis.

FIG. 10 and FIG. 11 show the prediction results for the total amount of power consumed by all raw materials in a unit. FIG. 10 shows the relationship between predicted power consumption and actual measured power consumption represented on a real axis. FIG. 10 (a) shows the results for the conventional method, and FIG. 10 (b) shows the results for the method. In the results of the conventional method, the data deviates greatly from a straight line with a 45° inclination. In the results of the method, by contrast, the data is collected along the straight line. This means the predicted power consumption was nearly the same as the actual measured power consumption. In other words, the prediction results closely matched the actual results.

FIG. 11 is a graph showing the relationship between predicted power consumption and actual measured power consumption represented on a logarithmic axis. FIG. 11 (a) shows the results for the conventional method, and FIG. 11 (b) shows the results for the method. In the results of the conventional method, only high power consumption matched a straight line with a 45° inclination. At lower power levels, hardly any predicted power consumption values represent actual measured power consumption values. This probably occurred because they could not scale to accommodate the differences in power consumption of each material in the units, and were pulled towards those with higher levels of power consumption.

In contrast, the predicted power consumption more accurately represented the actual measured power consumption at all levels. Even though power consumption was underestimated for raw materials with low power consumption in the unit, the error in the total amount of predicted power consumption was not great. Thus, it is clear that the method can very accurately predict power consumption.

Therefore, as mentioned above, by employing the method of the present disclosure, an output variable to be predicted can be accurately predicted even when the explanatory variables have only been partially observed. Also, existing regression methods can be used to make efficient predictions even when some of the explanatory variables are discrete variables. Because an output variable can be accurately predicted for individual elements in a set, the scale can be set for the error distribution.

The data prediction method of the present disclosure and a system for embodying this method has been explained with reference to the drawings. However, modifications can be made within a range conceivable by those skilled in the art such as other embodiments, additions, changes and omissions. All of these aspects are included in the scope of the present disclosure insofar as they manifest the operations and effects of the present disclosure.

A computer-readable program for executing the prediction method of the present disclosure can be provided, and this program can be stored and distributed on a recording medium such as a floppy disk, a CD-ROM, a DVD-ROM, an SD card or an HDD. The program can also be stored on a server connected to a network such as the Internet, and can be distributed via the network in response to a download request.

The invention claimed is:

1. A method for predicting an output variable from explanatory values provided as sets of combinations of discrete variables and continuous variables, wherein the method comprises:

receiving, with a processing device, input data that contains the explanatory variables to predict the output variable;

searching for each element in the combinations of discrete variables and continuous variables in the sets included in the input data for elements in a plurality of sets with matching discrete variables using training data related to a plurality of sets in which the output variable has been observed;

applying a function giving the degree of similarity between two sets weighed by a scale variable that represents a scalar corresponding to the output variable and is obtained from a continuous variable to each element in the input data, and to one or more elements found in the elements of the input data to calculate function values, and for calculating the sum of the function values for all of the elements in the input data; and applying the calculated sum for each element to a prediction equation for predicting the output variable to calculate a prediction value of the output variable for each element;

wherein a discrete variable is a variable representing the type of raw material included in a unit in which the output variable has been observed, continuous variables are represented as a vector summarizing continuous quantities related to the raw material included in the unit, a scale variable is a value corresponding to the output variable in the calculation results of an equation including the volume, mass or other variable of the raw material included in the unit and a plurality of these variables, and the output variable is the amount of power consumed by the unit.

2. The method of claim 1, wherein the function is a kernel function expressed by the following equation:

$$K(\{x_{i1}, x_{i2}, \ldots, x_{im[i]}\}, \{x_{j1}, x_{j2}, \ldots, x_{jm[j]}\}) = \sum_{k=1}^{M}\sum_{t=1}^{m[i]}\sum_{u=1}^{m[j]} s_{it}s_{ju}I(z_{it} = z_{ju} = k)\kappa_k(x_{it}, x_{ju})$$

wherein m[i] and m[j] are the number of elements included in unit i and unit j in which the output variable has been observed, M is the number of the types of elements, s is the scale variable, z is a discrete variable, x is a vector containing continuous variables, and I is a function in which "1" is given only when elements in unit i and unit j have matching discrete variables and "0" is given in all other cases.

3. The method of claim 1, wherein the prediction equation is a regression equation or a conditional density function.

4. The method of claim 1, wherein applicable prediction methods include Gaussian process regression, Nadaraya-Watson kernel regression, Relevance vector regression, Support vector regression, the Kullback-Leibler importance estimation procedure, least-square conditional density estimation, or any nonparametric regression or conditional density estimation methods using kernel functions between explanatory variables.

5. The method of claim 1, wherein the function is a kernel function, and wherein the prediction method uses Gaussian process regression and further includes optimizing a set of hyperparameters in the kernel function using training data, setting the optimized hyperparameters in the kernel function using the training data and computing a kernel matrix, and calculating parameters for setting the prediction equation using the computed kernel matrix.

6. A method for predicting an output variable from explanatory values provided as sets of combinations of discrete variables and continuous variables, wherein the method comprises:
receiving, with a processing device, input data that contains the explanatory variables to predict the output variable;
searching for each element in the combinations of discrete variables and continuous variables in the sets included in the input data for elements in a plurality of sets with matching discrete variables using training data related to a plurality of sets in which the output variable has been observed;
applying a function giving the degree of similarity between two sets weighed by a scale variable that represents a scalar corresponding to the output variable and is obtained from a continuous variable to each element in the input data, and to one or more elements found in the elements of the input data to calculate function values, and for calculating the sum of the function values for all of the elements in the input data; and
applying the calculated sum for each element to a prediction equation for predicting the output variable to calculate a prediction value of the output variable for each element;
wherein the function is a kernel function, wherein the prediction method uses Gaussian process regression and further includes optimizing a set of hyperparameters in the kernel function using training data, setting the optimized hyperparameters in the kernel function using the training data and computing a kernel matrix, and calculating parameters for setting the prediction equation using the computed kernel matrix, and wherein the optimization optimizes the hyperparameters using the maximum marginal likelihood method, computing the kernel matrix calculates diagonal elements using a plurality of scale variables included in each set for each set included in the training data to compute a diagonal matrix, and calculating the parameters calculates the parameters for setting the prediction equation using the computed kernel matrix and diagonal matrix.

7. A system for predicting an output variable from explanatory values provided as sets of combinations of discrete variables and continuous variables, wherein the system comprises:
a data-input unit configured to receive input data that contains the explanatory variables to predict the output variable;
an element-search unit configured to search for each element in the combinations of discrete variables and continuous variables in the sets included in the input data for elements in a plurality of sets with matching discrete variables using training data related to a plurality of sets in which the output variable has been observed;
a function-calculating unit configured to apply a function giving the degree of similarity between two sets weighed by a scale variable representing a scalar corresponding to the output variable obtained from a continuous variable to each element in the input data and to one or more elements found in the elements of the input data to calculate function values, and to calculate the sum of the function values for all of the elements in the input data; and
a prediction-value-calculating unit configured to apply the calculated sum for each element to a prediction equation for predicting the output variable to calculate a prediction value of the output variable for each element;
wherein a discrete variable is a variable representing the type of raw material included in a unit in which the output variable has been observed, continuous variables are represented as a vector summarizing continuous quantities related to the raw material included in the unit, a scale variable is a value corresponding to the output variable in the calculation results of an equation including the volume, mass or other variable of the raw material included in the unit and a plurality of these variables, and the output variable is the amount of power consumed by the unit.

8. The system of claim 7, wherein the function is a kernel function expressed by the following equation:

$$K(\{x_{i1}, x_{i2}, \ldots, x_{im[i]}\}, \{x_{j1}, x_{j2}, \ldots, x_{jm[j]}\}) = \sum_{k=1}^{M}\sum_{t=1}^{m[i]}\sum_{u=1}^{m[j]} s_{it}s_{ju}I(z_{it} = z_{ju} = k)\kappa_k(x_{it}, x_{ju})$$

wherein m[i] and m[j] are the number of elements included in unit i and unit j in which the output variable has been observed, M is the number of the types of elements, s is the scale variable, z is a discrete variable, x is a vector containing continuous variables, and I is a function in which "1" is given only when elements in unit i and unit j have matching discrete variables and "0" is given in all other cases.

9. The system of claim 7, wherein the prediction equation is a regression equation or a conditional density function.

10. The system of claim 7, wherein applicable prediction systems include normal regression, Nadaraya-Watson kernel regression, Relevance vector regression, Support vector regression, the Kullback-Leibler importance estimation procedure, least-square conditional density estimation, or any nonparametric regression or conditional density estimation methods using kernel functions between explanatory variables.

11. The system of claim 7, wherein the function is a kernel function, and wherein the prediction system uses Gaussian process regression and further includes a parameter-optimizing-unit for optimizing a set of hyperparameters in the kernel function using training data, a kernel-matrix-computation unit for setting the optimized hyperparameters in the kernel function using the training data and computing a kernel matrix, and a parameter-calculating unit for calculating parameters for setting the prediction equation using the computed kernel matrix.

12. A system for predicting an output variable from explanatory values provided as sets of combinations of discrete variables and continuous variables, wherein the system comprises:
a data-input unit configured to receive input data that contains the explanatory variables to predict the output variable;
an element-search unit configured to search for each element in the combinations of discrete variables and continuous variables in the sets included in the input data for elements in a plurality of sets with matching discrete variables using training data related to a plurality of sets in which the output variable has been observed;
a function-calculating unit configured to apply a function giving the degree of similarity between two sets weighed by a scale variable representing a scalar corresponding to the output variable obtained from a continuous variable to each element in the input data and to one or more elements found in the elements of the input data to calculate function values, and to calculate the sum of the function values for all of the elements in the input data; and
a prediction-value-calculating unit configured to apply the calculated sum for each element to a prediction equation for predicting the output variable to calculate a prediction value of the output variable for each element;
wherein the function is a kernel function, wherein the prediction system uses Gaussian process regression and further includes a parameter-optimizing unit for optimizing a set of hyperparameters by the kernel function using training data, a kernel-matrix-computation unit for setting the optimized hyperparameters in the kernel function using the training data and computing a kernel matrix, and a parameter-calculating unit for calculating parameters for setting the prediction equation using the computed kernel matrix, and wherein the parameter-optimization unit optimizes the hyperparameters using the maximum marginal likelihood method, the kernel-matrix-computation unit calculates diagonal elements using a plurality of scale variables included in each set for each set included in the training data to compute a diagonal matrix, and the parameter-calculating unit calculates the parameters for setting the prediction equation using the computed kernel matrix and diagonal matrix.

13. A non-transitory computer-readable storage medium having computer readable instruction stored thereon, that when executed by a computer implement a method for predicting an output variable from explanatory values provided as sets of combinations of discrete variables and continuous variables, wherein the method comprises:
receiving, with a processing device, input data that contains the explanatory variables to predict the output variable;
searching for each element in the combinations of discrete variables and continuous variables in the sets included in the input data for elements in a plurality of sets with matching discrete variables using training data related to a plurality of sets in which the output variable has been observed;
applying a function giving the degree of similarity between two sets weighed by a scale variable that represents a scalar corresponding to the output variable and is obtained from a continuous variable to each element in the input data, and to one or more elements found in the elements of the input data to calculate function values, and for calculating the sum of the function values for all of the elements in the input data; and
applying the calculated sum for each element to a prediction equation for predicting the output variable to calculate a prediction value of the output variable for each element;
wherein a discrete variable is a variable representing the type of raw material included in a unit in which the output variable has been observed, continuous variables are represented as a vector summarizing continuous quantities related to the raw material included in the unit, a scale variable is a value corresponding to the output variable in the calculation results of an equation including the volume, mass or other variable of the raw material included in the unit and a plurality of these variables, and the output variable is the amount of power consumed by the unit.

14. The non-transitory computer-readable storage medium of claim 13, wherein the function is a kernel function expressed by the following equation:

$$K(\{x_{i1}, x_{i2}, \ldots, x_{im[i]}\}, \{x_{j1}, x_{j2}, \ldots, x_{jm[j]}\}) = \sum_{k=1}^{M} \sum_{t=1}^{m[i]} \sum_{u=1}^{m[j]} s_{it} s_{ju} I(z_{it} = z_{ju} = k) \kappa_k(x_{it}, x_{ju})$$

wherein m[i] and m[j] are the number of elements included in unit i and unit j in which the output variable has been observed, M is the number of the types of elements, s is the scale variable, z is a discrete variable, x is a vector containing continuous variables, and I is a function in which "1" is given only when elements in unit i and unit j have matching discrete variables and "0" is given in all other cases.

15. The non-transitory computer-readable storage medium of claim 13, wherein the prediction equation is a regression equation or a conditional density function.

16. The non-transitory computer-readable storage medium of claim 13, wherein applicable prediction systems include Gaussian process regression, Nadaraya-Watson kernel regression, Relevance vector regression, Support vector regression, the Kullback-Leibler importance estimation procedure, least-square conditional density estimation, or any nonparametric regression or conditional density estimation methods using kernel functions between explanatory variables.

17. The non-transitory computer-readable storage medium of claim 13, wherein the function is a kernel function, wherein the prediction method uses Gaussian process regression, and wherein the program further executes in a computer optimizing a set of hyperparameters in the kernel function using training data, setting the optimized hyperparameters in the kernel function using the training data and computing a kernel matrix, and calculating parameters for setting the prediction equation using the computed kernel matrix.

18. A non-transitory computer-readable storage medium having computer readable instruction stored thereon, that when executed by a computer implement a method for predicting an output variable from explanatory values provided as sets of combinations of discrete variables and continuous variables, wherein the method comprises:

receiving, with a processing device, input data that contains the explanatory variables to predict the output variable;

searching for each element in the combinations of discrete variables and continuous variables in the sets included in the input data for elements in a plurality of sets with matching discrete variables using training data related to a plurality of sets in which the output variable has been observed;

applying a function giving the degree of similarity between two sets weighed by a scale variable that represents a scalar corresponding to the output variable and is obtained from a continuous variable to each element in the input data, and to one or more elements found in the elements of the input data to calculate function values, and for calculating the sum of the function values for all of the elements in the input data; and applying the calculated sum for each element to a prediction equation for predicting the output variable to calculate a prediction value of the output variable for each element;

wherein the function is a kernel function, wherein the prediction method uses Gaussian process regression, wherein the program further executes in a computer optimizing a set of hyperparameters in the kernel function using training data, setting the optimized hyperparameters in the kernel function using the training data and computing a kernel matrix, and calculating parameters for setting the prediction equation using the computed kernel matrix, and wherein the optimization optimizes the hyperparameters using the maximum marginal likelihood method, computing the kernel matrix calculates diagonal elements using a plurality of scale variables included in each set for each set included in the training data to compute a diagonal matrix, and calculating the parameters calculates the parameters for setting the prediction equation using the computed kernel matrix and diagonal matrix.

\* \* \* \* \*